US006788654B1

(12) United States Patent
Hashimoto et al.

(10) Patent No.: US 6,788,654 B1
(45) Date of Patent: Sep. 7, 2004

(54) DIGITAL DATA RECEIVER

(75) Inventors: Akinori Hashimoto, Tokyo (JP); Hisakazu Katoh, Tokyo (JP); Hiroyuki Hamada, Tokyo (JP); Kyoichi Saito, Tokyo (JP); Tomohiro Saito, Tokyo (JP); Fumiaki Minematsu, Tokyo (JP)

(73) Assignee: Nippon Hoso Kyokai, Tokyo (JP)

(*) Notice: Subject to any disclaimer, the term of this patent is extended or adjusted under 35 U.S.C. 154(b) by 0 days.

(21) Appl. No.: 09/402,700
(22) PCT Filed: Jan. 26, 1999
(86) PCT No.: PCT/JP99/00302
§ 371 (c)(1),
(2), (4) Date: Dec. 15, 1999
(87) PCT Pub. No.: WO99/39471
PCT Pub. Date: Aug. 5, 1999

(30) Foreign Application Priority Data

Jan. 29, 1998 (JP) .............................. 10-16620

(51) Int. Cl.⁷ .............................................. H04B 7/212
(52) U.S. Cl. ....................................... 370/321; 714/704
(58) Field of Search ................................ 370/204, 206, 370/207, 215, 252, 336, 337, 347, 442, 321; 375/152, 222, 148, 150, 279–284, 343; 714/704, 712, 747, 715

(56) References Cited

U.S. PATENT DOCUMENTS 5,533,004 A * 7/1996 Jasper et al. .................. 370/11
5,781,542 A * 7/1998 Tanaka et al. ............... 370/342
5,878,041 A * 3/1999 Yamanaka et al. ..... 370/395.65

FOREIGN PATENT DOCUMENTS

EP  0676875  10/1995
GB  2312359  10/1997
JP  474046   3/1992

OTHER PUBLICATIONS

PCT International Search Report dated Mar. 16, 1999.
H. Katoh, A. Hashimoto, et al., "A Flexible Transmission Technique for the Satellite ISDB System," IEEE, Trans on Broadcasting, vol. 42, No. 3, Sep. 1996, pp. 159–166.
H. Katoh, et al.; "A Flexible Transmissions Technique for the Satellite ISDB System," IEEE Transactions on Broadcasting, IEEE Inc.New York, US, vol. 42, No. 3, Sep. 1996, pp. 159–166, XP000834276, ISSN: 0018–9316.

* cited by examiner

Primary Examiner—Wellington Chin
Assistant Examiner—Brenda Pham
(74) Attorney, Agent, or Firm—Stevens, Davis, Miller & Mosher, LLP (57) ABSTRACT

After receiving a time division multiplex signal including a plurality of digital data signals transmitted in accordance with different transmission schemes, the received time division multiplex signal is demodulated by a demodulation circuit, and it is judged by a detection circuit whether each of the demodulated digital data signals is received correctly or not. When it is detected that a digital data signal transmitted by any one of the plurality of different transmission schemes is not received correctly, the relevant digital data signal is replaced by a suitable signal such as a null packet signal which does not affect a correct reception of the remaining digital data signals transmitted by the remaining transmission schemes to form a corrected time division multiplexed signal even if a digital data signal is not received correctly.

4 Claims, 11 Drawing Sheets

DIGITAL DATA RECEIVER

TECHNICAL FIELD

The present invention relates to a digital data time division multiplex transmission technique, in which a plurality of digital data signals formed by different modulation schemes or different error correction codes are transmitted in different packets of a time division multiplex transmission, and at a receiver end, a desired digital data signal is selectively extracted among the transmitted plurality of digital data signals, and particularly relates to a digital data receiving apparatus, in which the transmitted plural digital data signals can be prevented from being interacted mutually upon an occasion that a transmission condition is degraded.

TECHNICAL BACKGROUND

For instance, in a conventional television broadcasting, it is general that one kind of plural transmission schemes is selected. However, in BS digital broadcasting utilizing a broadcasting satellite as a relay station, it has been proposed to utilize commonly a rare relay station by a plurality of broadcasting enterprises or program suppliers. That is to say, it has been proposed to transmit a plurality of digital broadcasting programs via a single BS channel.

In this case, it is desirable that each of broadcasting enterprises can freely select a transmission scheme having a desired error tolerance against a low C/N (a ratio of received carrier wave to noise). This can be achieved in that when respective broadcasting enterprises transmit digital data signals (services) with desired transmission schemes, respective data signals are compressed on a time axis and are transmitted in a multiplex mode (time division multiplex). For instance, it is now assumed that a plurality of digital television signals produced by a plurality of broadcasting enterprises are transmitted in a multiplex mode in accordance with MPEG. Then, each of TS (Transport Stream) packets supplied from respective broadcasting enterprises has added thereto an identification flag of 13 bits, i.e. identifier called PID (Packet Identification) information for identifying broadcasting enterprises to which respective packets belong. By using such an identifier, at a receiver end, only a desired packet can be selectively extracted from the received packet stream, and desired picture and audio information can be decoded.

As stated above, the services supplied from respective broadcasting enterprises to respective users are transmitted in accordance with desired transmission schemes having desired error tolerances, i.e. desired error correction code and/or modulation scheme. For instance, TC8PSK modulation scheme, QPSK system, BPSK system and so on have been developed as the modulation scheme for the BS digital broadcasting, and further various error correction codes have been proposed. It is desirable that respective broadcasting enterprises can select any of these error correction codes and modulation schemes. For instance, it is desired that when there is not a fear that the transmission quality is degraded by a rail attenuation, the 8PSK system having a larger transmission capacity is used, but when the transmission quality might be degraded, the QPSK system or BPSK system having a higher tolerance against a rain attenuation is used.

In this case, depending upon a degree of degradation due to transmission conditions, certain data transmitted by a certain transmission scheme is correctly transmitted, but another data transmitted by another transmission scheme might not be used because a bit error rate is too high. In this case, it should be accepted that the data transmitted under a condition of a higher bit error rate could not be used, but since the PID information in the unusable packet is also subjected to the bit error, there is a certain possibility that this PID information might be accidentally changed into another PID information whose packet is transmitted correctly. If such an occasion arises, a service transmitted by the correctly transmitted packet might be disturbed (interdata interference). Therefore, it is desired that although a transmission packet of a certain broadcasting enterprise utilizing a certain modulation scheme or a certain error correction code is disturbed, this does not affect transmission packets of the other broadcasting enterprises.

The present invention has for its object to provide a digital data receiving apparatus, in which the above mentioned interference between data packets transmitted on the time division multiplex mode with different transmission schemes can be suppressed.

DISCLOSURE OF THE INVENTION

According to the invention, a digital data receiving apparatus for receiving a desired digital data signal among a plurality of digital data signals transmitted on the time division multiplex mode in accordance with different transmission schemes comprises:

a means for detecting whether or not a correct reception can be effected for each of said plurality of different transmission schemes; and a means for replacing a transmission packet transmitted by a transmission scheme which is judged to be unable to perform a correct reception, by a signal which does not affect packets transmitted by another transmission schemes.

In a preferable embodiment of the digital data receiving apparatus according to the invention, said means for detecting whether or not a correct reception can be effected for each of said plurality of different transmission schemes includes a circuit for detecting a bit error rate of a signal which is transmitted by each of said different transmission schemes, and a comparator for comparing said bit error rate with a predetermined threshold value to judge that a correct reception can not be performed when said bit error rate exceeds said threshold value.

In another preferable embodiment of the digital data receiving apparatus according to the invention, said means for detecting whether or not a correct reception can be effected for each of said plurality of different transmission schemes includes a circuit for detecting an occasion that a bit error of a signal transmitted by each of said different transmission schemes could not be corrected.

Furthermore, in the digital data receiving apparatus according to the invention, it is preferable that said means for replacing a transmission packet transmitted by a transmission scheme which is judged to be unable to perform a correct reception, by a signal which does not affect packets transmitted by another transmission schemes comprises a circuit for replacing the relevant received packet into a null packet. Here, the null packet is a packet in which all bits except for first synchronizing bytes (47HEX) are 1.

In another preferable embodiment of the digital data receiving apparatus according to the invention, said detecting means is consisting of a bit error rate estimating means or an error correction impossible detecting means.

BEST MODE FOR CARRYING OUT THE INVENTION

Now the present invention will be explained in detail on the basis of the embodiments with reference to the accompanied drawings.

As stated above, in the present invention, a plurality of transmission schemes each being composed of any combination of modulation schemes and error correction codes are utilized simultaneously to perform the multiplex transmission, and transmission conditions of respective transmission schemes are detected. When a packet is judged to be unusable due to a high bit error rate, the relevant packet is replaced by a null packet or any other signal which does not affect correctly transmitted packets. In this manner, the packet having a degraded bit error rate can be prevented from being erroneously recognized as a correctly transmitted packet transmitted by another transmission scheme, and data transmitted by a transmission scheme having a higher error tolerance can be prevented from being disturbed by data transmitted by a lower error tolerance.

The present invention will be explained with reference to the practical embodiments.

In the embodiment to be explained hereinbelow, transmission schemes are those which have been developed for the BS digital broadcasting via broadcasting satellites.

At first, the structure of the multiplex signal to be transmitted will be explained.

Figure 1:
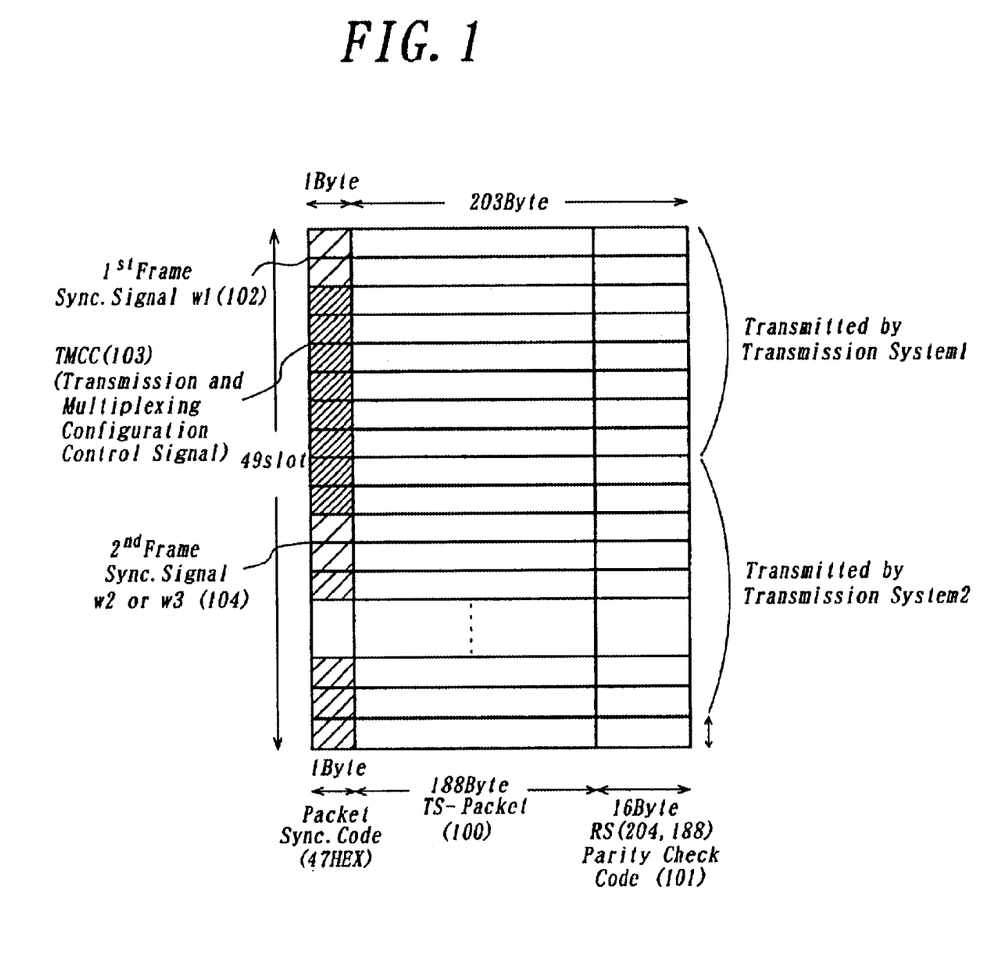
FIG. 1 is a schematic view showing an example of the frame structure of the BS broadcasting multiplexed signal.

FIG. 1 illustrates an example of the (BS broadcasting) multiplex signal structure.

In this system, picture signals, audio signals and various kinds of digital data signals are multiplexed on the basis of the MPEG 2 systems, and a TS (Transport Stream) packet (100) consisting of 188 Bytes is produced. As shown in FIG. 1, following to the TS packet, there are provided 16 parity check bytes (101) consisting of Reed-Solomon code (RS (204,188)), and a single frame is consisting of 49 packets each having the above structure. A position at which each of said packets situates in the frame is termed as a slot. A forty ninth slot is a dummy slot, which has been previously inserted for generating a BPSK burst period for reinforcing the carrier recovery. At a front byte of each of the TS packets, there is initially inserted a packet synchronizing code of one byte (47 in hexadecimal notation). In the present embodiment, upon forming the frame structure, this portion is overwritten with total 12 bytes (96 bits) consisting of a first frame synchronizing signal w1 (102) of two bytes (16 bits), a control signal (103) called a TMCC (Transmission and Multiplexing Configuration Control) signal of 8 bytes and a second frame synchronizing signal w2 (or w3) (104) of 2 bytes (16 bits).

There is a case in which only a single TS packet within a single frame is transmitted by a certain transmission scheme. In such a case, in order to perform the code stirring (interleave) having a sufficient depth (not less than eight) for deriving the error code correcting ability, a super frame is composed of eight frames and the interleave is effected within the super frame. Then, it is necessary to identify a first frame position within the super frame. For this purpose, when the second frame synchronizing signal (104) is formed by w2, it is denoted that the relevant frame is the first frame of the super frame, and when w3, the relevant frame is denoted as a frame others than the first frame of the super frame.

In a slot, there is denoted a transmission scheme which is desired by a broadcasting enterprise who occupies the relevant slot. For instance, as depicted in FIG. 1, first eight slots are transmitted by a transmission scheme 1 and the remaining forty slots are transmitted by a transmission scheme 2.

Information denoting a relationship between respective slot positions and transmission schemes is described in the TMCC signal. It should be noted that a content in the TMCC signal denotes the frame configuration after two super frames, and therefore when a transmission scheme is changed, a content in the TMCC signal has to be changed before two super frames.

Figure 2:
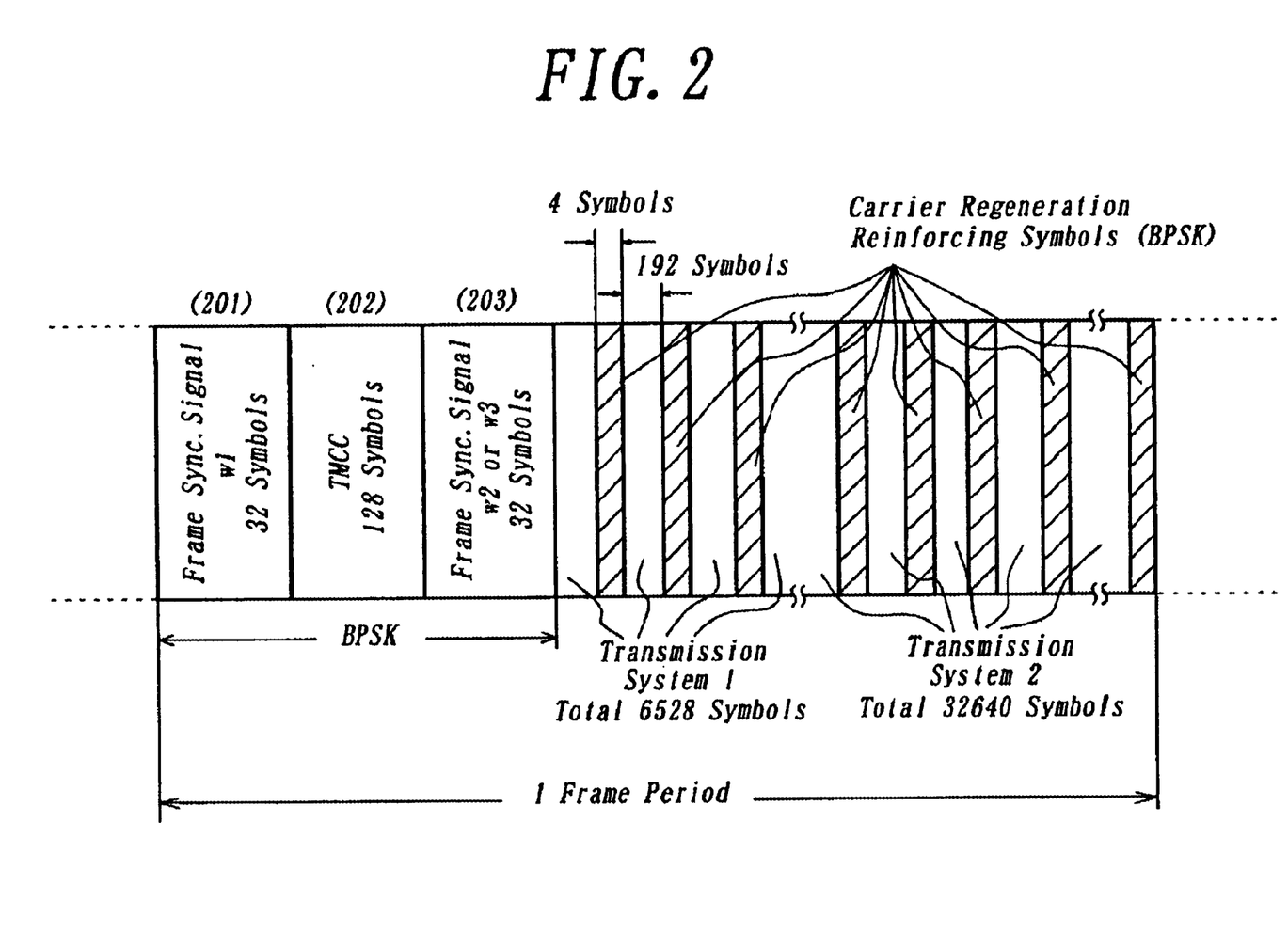
FIG. 2 is a diagram illustrating an example of the BS broadcasting modulated wave.

FIG. 2 shows an example of the BS broadcasting modulated wave obtained from the multiplex signal having the frame configuration using the transmission scheme 1 as well as the transmission scheme 2.

As shown in FIG. 2, from a first frame period, a header of 192 symbols composed of a first frame synchronizing signal W1 (32 symbols)(201), a TMCC signal (128 symbols)(202) and a second frame synchronizing signal W2 (or W3)(32 symbols)(203) is multiplexed by the binary phase shift keying (BPSK) modulation. It should be noted that the number of symbols of these signals is twice of the number of bits (64 bits) of portions corresponding to the TMCC signal shown in FIG. 1. This is due to the fact that these signals are coded by the convolutional encoding having an encoding rate of 1/2, and redundant bits whose number is identical with that of the original data are added.

Following to the header portion, eight slots of a main signal (service data) are multiplexed by using the transmission scheme 1 and then forty slots are multiplexed by using the transmission scheme 2. It should be noted that in the main signal section, for the modulated wave of 192 symbols used for the transmission of the main signal, a BPSK modulated wave (carrier recovery reinforcing symbol) having four random symbols is inserted. By means of such a BPSK modulated wave, the carrier recovery up to a low C/N can be performed.

By using the BS broadcasting modulated wave having the above mentioned configuration, at a BS receiver end, after capturing the frame synchronizing signal, the TMCC signal portion is demodulated and decoded, the transmission scheme of the following main signal is detected, and the demodulation and decoding are carried out in accordance with the detected transmission scheme. Therefore, although the transmission scheme is to be changed, transmission schemes for respective slots can be dynamically changed for every super frame.

Figure 3:
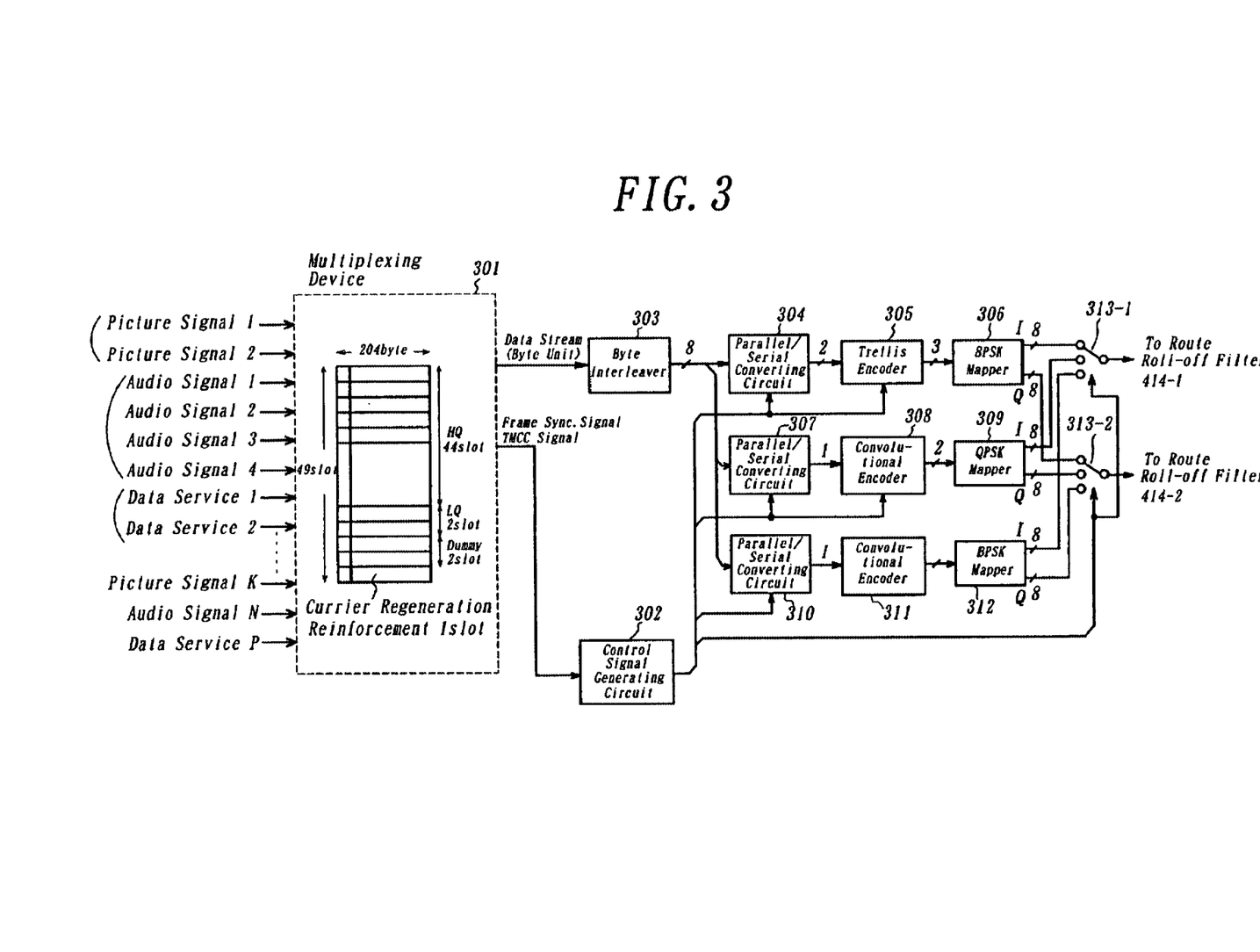
FIG. 3 is a circuit diagram depicting an embodiment of the digital modulation circuit generating the BS broadcasting modulated wave.
Figure 4:
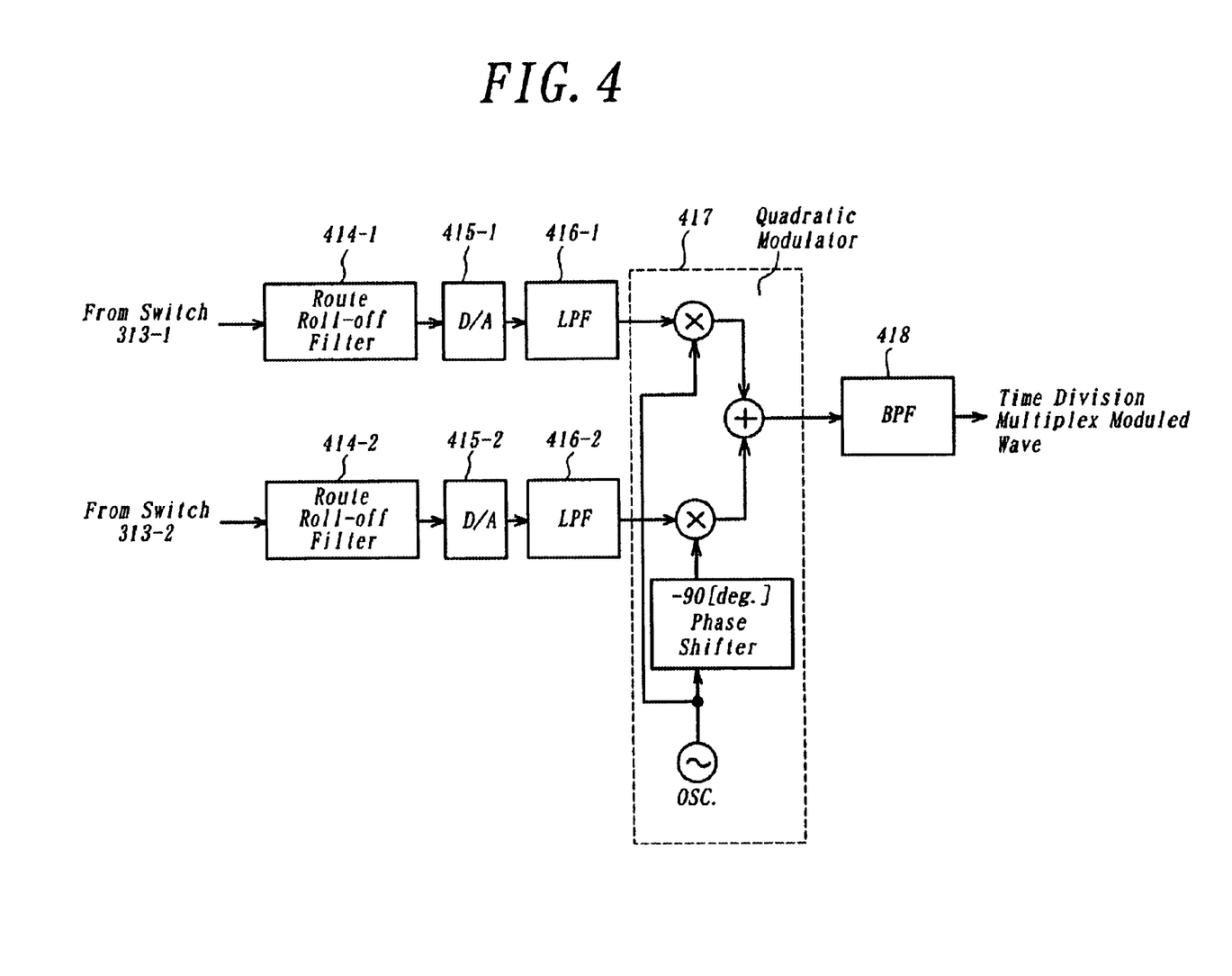
FIG. 4 is an embodiment of the digital modulation circuit generating the BS broadcasting modulated wave.

FIGS. 3 and 4 show embodiments of a first half and a second half, respectively of the digital modulation circuit for producing the above mentioned BS broadcasting modulated wave.

In FIG. 3, picture signals, audio signals and data services are multiplexed by a multiplexing device 301 into the frame configuration composed of 49 slots (see FIG. 1). In the present embodiment, 44 packets are transmitted as high quality information (hereinafter referred to HQ) by using the trellis-coded 8 PSK (TC8PSK) modulation scheme, and two packets are transmitted as a high reliability information (hereinafter referred to LQ) by using a combination of the error correction coding with the convolutional coding having a coding rate of 1/2 and the quadrature phase shift keying (QPSK) modulation scheme. It is now assumed that one slot is allocated to one packet, and then in the frame configuration (49 slots) described in the multiplexing device 301 enclosed by a broken line, HQ occupies 44 slots and LQ occupies 2 slots as shown in the drawing.

If all the data is transmitted by the TC8PSK modulation scheme having a high frequency efficiency, it is possible to transmit data of 48 slots within a single frame period. However, in the present example, since the two packets data is transmitted by the QPSK+1/2 modulation scheme whose frequency efficiency is a half of TC8PSK, there is two slots data which could not be transmitted within a single frame. Therefore, in the present example, there are inserted non-transmitted packets (dummy packets) whose number is equal to that of the slots transmitted by the QPSK+1/2 modulation scheme, i.e. two dummy slots. In this manner, the number of slots per unit frame is remained constant in regardless of the modulation scheme.

In addition to the above mentioned HQ and LQ information for transmitting the services such as the picture signals and audio signals, the frame synchronizing signal denoting the front position of the frame as well as the TMCC signal are produced from the multiplexing device 301. In a control signal generating circuit 302, the data stream currently produced from the multiplexing device 301 is identified to be HQ or LQ or dummy packet which is wasted without being transmitted, and control signals for controlling the operation of various circuits to be explained hereinbelow are produced.

Figure 5A:
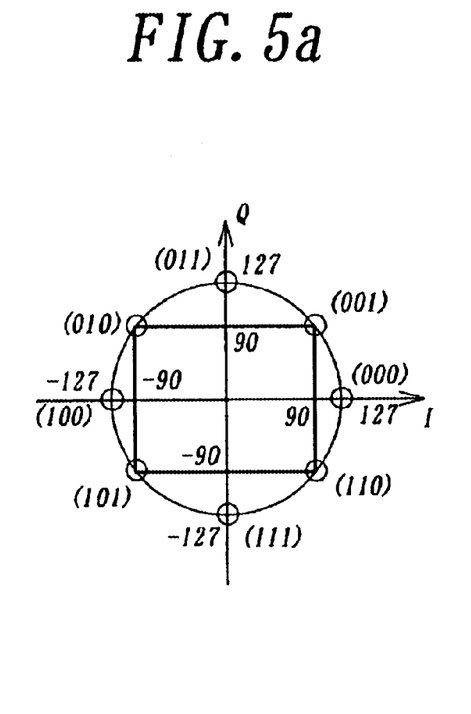
FIGS. 5a, 5b and 5c are diagrams showing manners of outputting signals in respective mappers of 8PSK, QPSK and BPSK shown in FIG. 3.

The slot signal allocated to HQ is supplied via a byte interleaver 303 to a parallel/serial converting circuit 304, in which the data stream of eight bits is converted into a data stream of two bits (in the drawing, a numerical number on a line connecting blocks denotes the number of data bits). The data stream of two bits is further converted into coded data of three bits by adding an error correction code in a trellis-encoder 305. Then, the 3 bit coded data is converted into a signal representing a message consisting of I and Q (each 8 bits) with the aid of an 8PSK mapper 306. FIG. 5a shows this 8PSK mapper.

As show in FIG. 5a, for instance, when a 3 bit signal (101) is input, an output becomes I=−90 and Q=+90. The mapper is generally constructed by ROM.

Figure 5B:
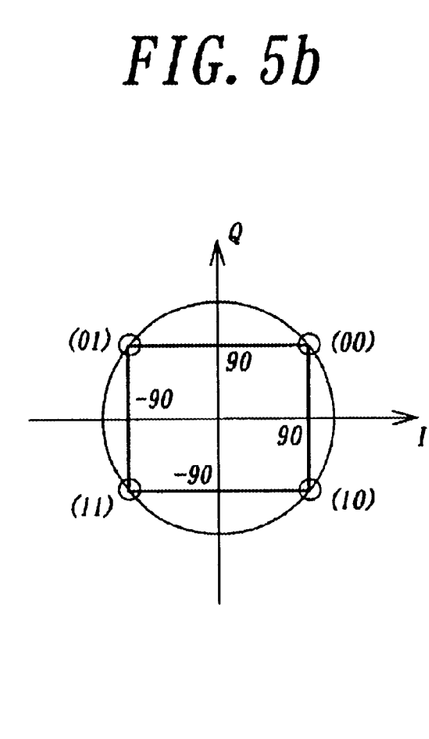

Like as the slot signal allocated to HQ, the slot signal allocated to LQ is supplied via the byte interleaver 303 to a parallel/serial converting circuit 307, in which the data stream of eight bits is converted into a data stream of one bit. This data stream of one bit is converted into a coded data of two bits by adding an error correction code in a convolutional encoder 308. This coded data of two bits is converted into a signal denoting signal points I and Q (each 8 bits) with the aid of a QPSK mapper. This QPSK mapper is illustrated in FIG. 5b.

Figure 5C:
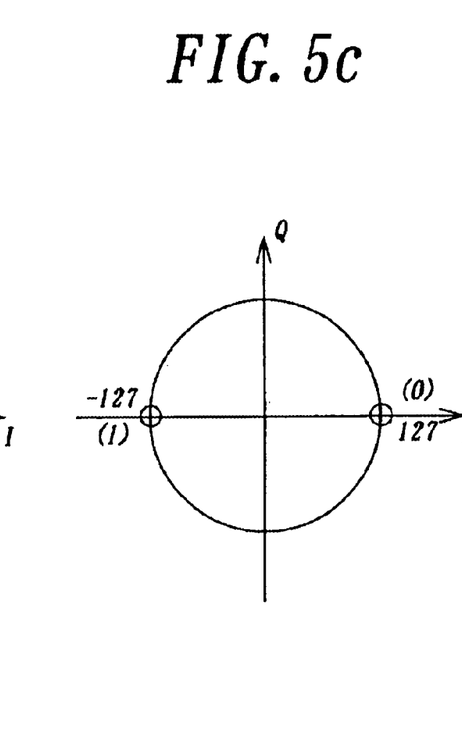

A portion of the synchronizing signal of tow bytes (16 bits) described at a front position of each slot, and the synchronizing signal w2 or w3 of two bytes (16 bits) (w2 is described at a front frame of a super frame and w3 is described in the other cases) is supplied via the byte interleaver 303 to a parallel/serial converting circuit 310 like as HQ and LQ information, and these synchronizing signals are converted from eight bits into one bit (said portion being transmitted with an addition of a convolutional code having a coding rate of 1/2 in order to attain a higher reliability). After that, an error correction code is added to the converted signal by a convolutional encoder 311, and then the signal is converted into a signal (each 8 bits) denoting signals I and Q with the aid of a BPSK mapper 312. FIG. 5c shows this BPSK mapper.

Figure 6:
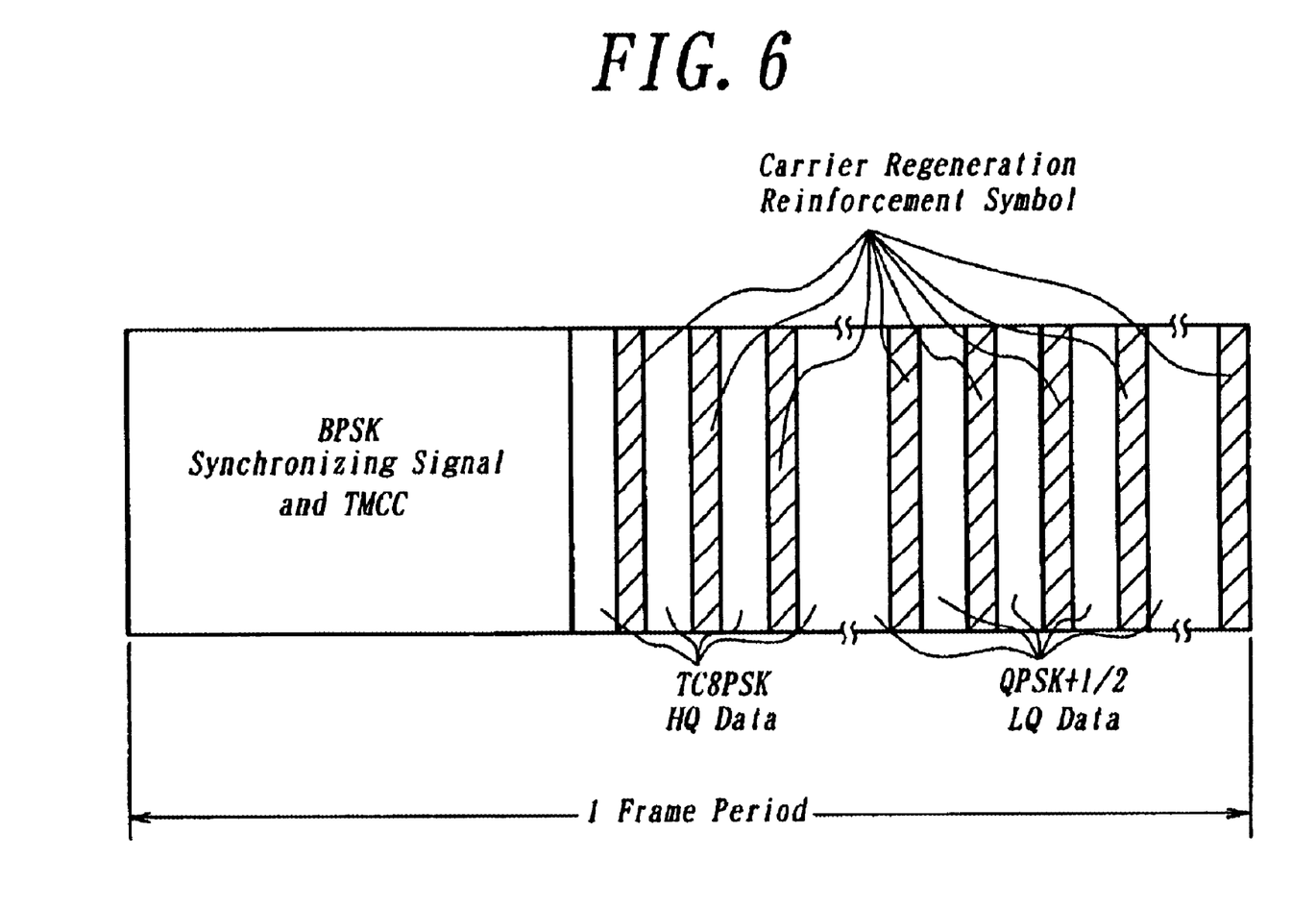
FIG. 6 is a diagram illustrating the data structure of the time division multiplex modulated wave.

The I and Q signals obtained in the manner explained above corresponding to the HQ, LQ, synchronizing signals and TMCC signal are successively changed by means of switches 313-1 and 313-2 which are driven by the control signals produced by the control signal generating circuit 302 to obtain time division multiplexed I signal and Q signal. These I signal and Q signal are supplied via root roll-off filters 414-1, 414-2, D/A converters 415-1, 415-2 and low pass filters 416-1, 416-2, respectively to a quadrature modulator 417, and are quadratically modulated. Then, unnecessary spectra are removed by a band pass filter 418 to obtain the time division multiplex modulated wave as shown in FIG. 6.

It should be noted that by changing a content of the TMCC signal in preceding super frames, the frame structure having the different number of allocated slots may be started from a succeeding frame.

Next, the circuit construction of the demodulation scheme will be explained.

Figure 7:
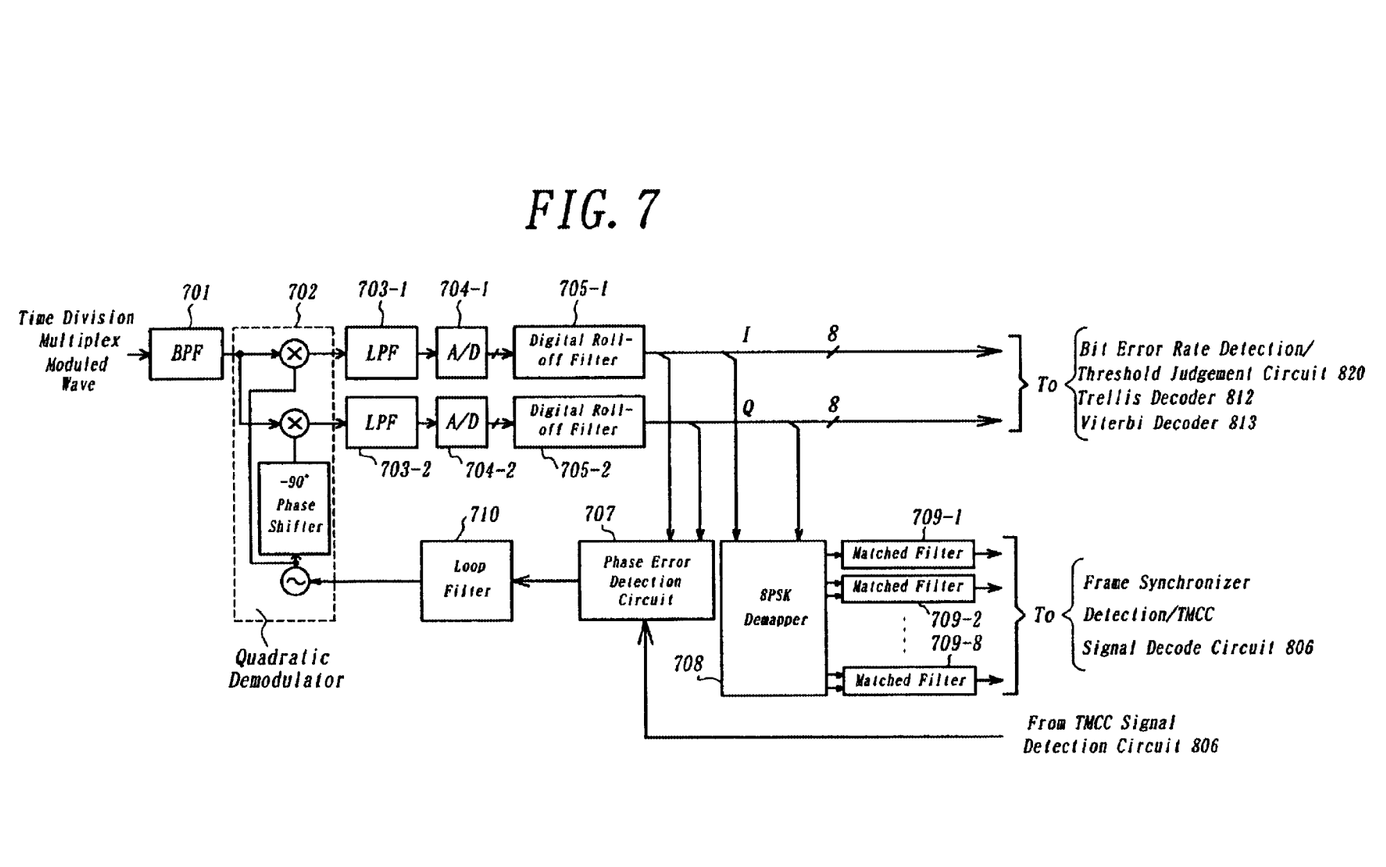
FIG. 7 is a circuit diagram showing an embodiment of the digital demodulation circuit demodulating the transmitted time division multiplex modulated wave.
Figure 8:
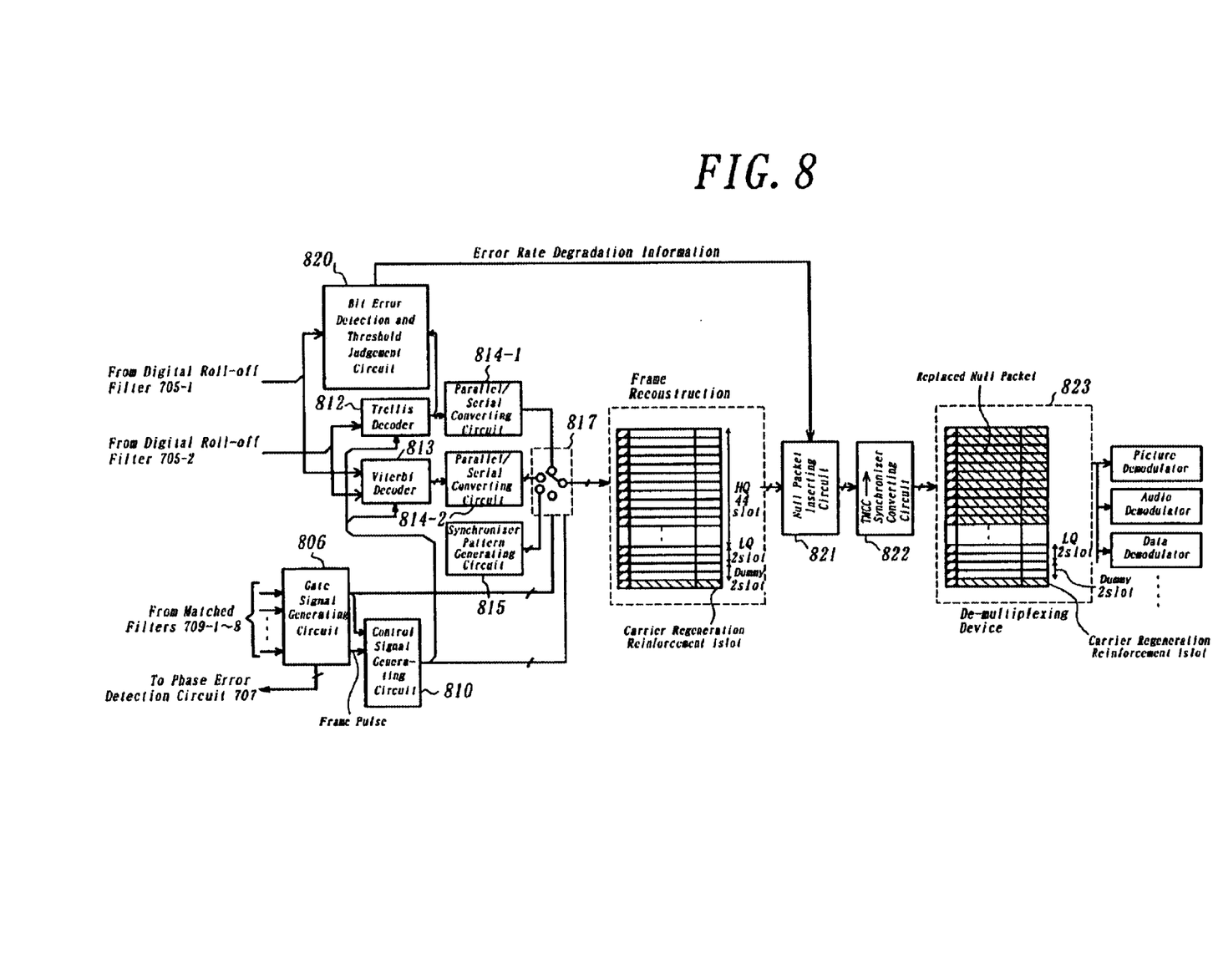
FIG. 8 is a circuit diagram showing an embodiment of the digital demodulation circuit demodulating the transmitted time division multiplex modulated wave.

FIGS. 7 and 8 illustrate first and second halves, respectively of an embodiment of the digital demodulation circuit for demodulating the time division multiplexed signal in which the TMCC signal is multiplexed by means of the above mentioned digital modulation circuit (see FIGS. 3 and 4).

In FIG. 7, the input time division multiplex modulated wave (refer to FIG. 6) is first supplied to a band pass filer 701 and unnecessary spectra are removed. After that, after converted into base band I and Q signals by means of a quadrature demodulator 702, harmonic components are removed by means of low pass filters 703-1, 703-2, and the these signals are digitalized by means of A/D converters 704-1, 704-2 (here each of I and Q are 8 bits), and intersymbol interference is removed by means of digital roll-off filters 705-1, 705-2. In this case, a TMCC signal detection circuit shown in FIG. 8 generates a frame synchronizing signal, a signal denoting the BPSK modulation scheme for TMCC period and a signal denoting the 8PSK modulation scheme for the remaining period, and these signals are supplied to a phase error detection circuit 707. The phase error detection circuit 707 outputs a phase error signal corresponding to 8PSK, and a carrier is reproduced by means of a loop filter 710.

Figure 9:
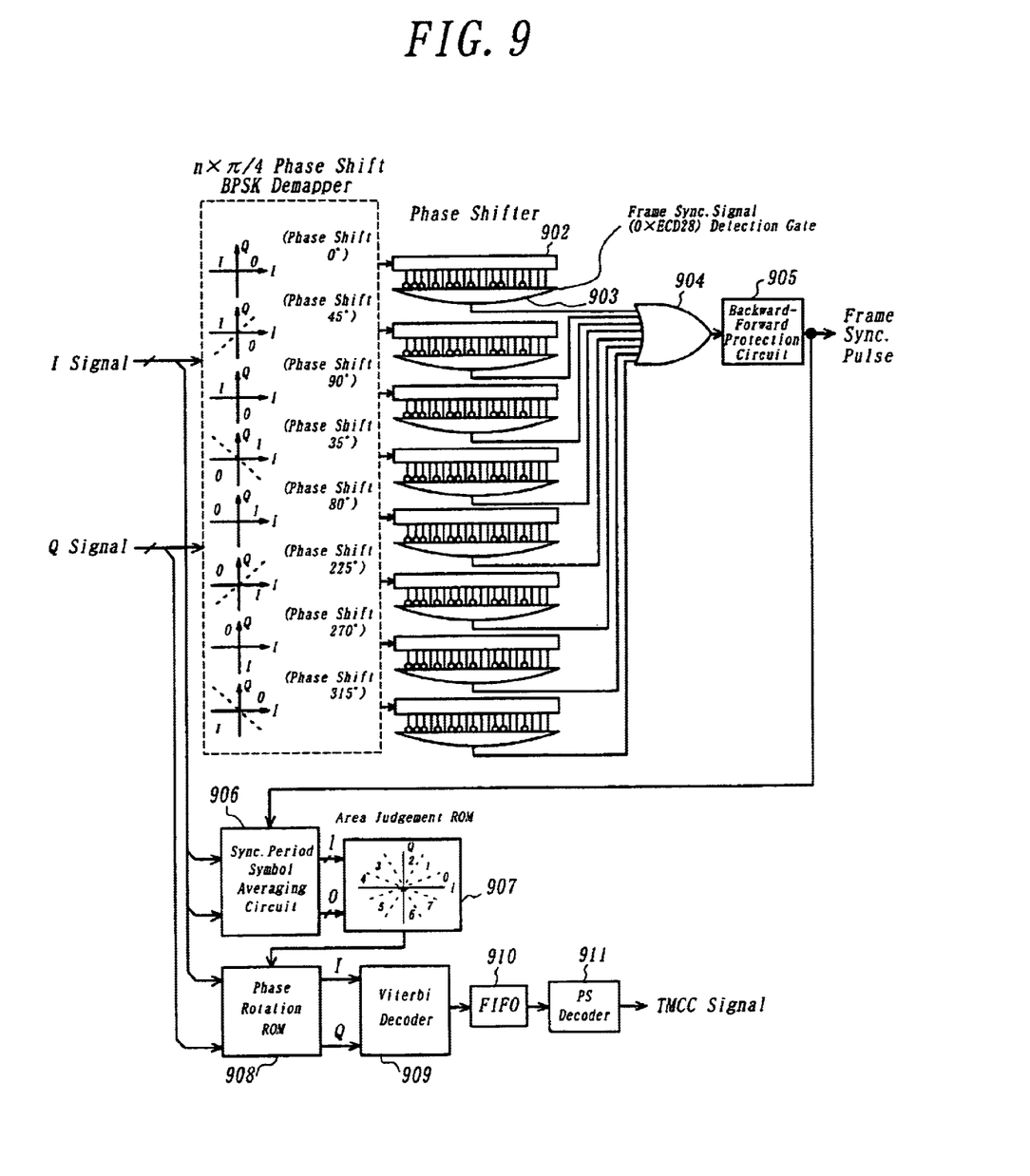
FIG. 9 is a circuit diagram depicting a circuit portion including the 8PSK demapper and matched filter shown in FIG. 7 as well as the circuit for detecting the frame synchronizing signal and TMCC signal.

Next, the thus obtained I signal and Q signal are subjected to the 8PSK demapping (hard decision) by means of an 8PSK demapper 708 having a phase shift of n×π/4 (n=0, 1, - - - 7), and an output is compared with the frame synchronizer in matched filters 1-8(709-1–709-8) to derive a correlation value. This output contains an equidistant series of positive and negative correlation pulses. FIG. 9 shows this portion in detail.

The input I signal and Q signal are subjected to the BPSK demapping having eight phases by means of a BPSK demapper 901 having the phase shifts of n×π/4 (n=0, 1, - - - 7). There is provided a shift register 902 of 20 bits for each of the eight output signals to perform the serial/parallel conversion, and the frame synchronizing signal is captured by a frame synchronizing signal detection gate 903. In this case, when the reproduced carrier situates in a vicinity of a correct frequency, the frame synchronizing signal can be detected by at least one of the eight gates 903. A logic sum of all the outputs of the detection gates is formed by an OR gate 904, and quasi-synchronizing signals are removed by a forward-backward protection circuit 905 by utilizing the fact that the frame synchronizing signal output from the OR gate occurs at an interval of frame period. In this manner, only the correct frame synchronizing signal can be extracted.

By using the thus extracted frame synchronizing signal, the symbol averaging is performed in a synchronization section symbol averaging circuit 906. Since the code series of the synchronizing symbol has a known value, when the incoming synchronizer code is 1, a phase shift of 180° is given, and when 0, a phase shift of 0° is given, and after that the symbol averaging is effected. Then, the averaging circuit 906 outputs on the symbol of the BPSk code "0". By supplying this signal to an area judging ROM 907, the BPSk code "0" is demodulated with a phase shift of m×/4 (m=0, 1, - - - 7) with respect to the original phase. By utilizing this information, a phase rotation ROM 908 gives a phase shift which can cancel the above phase shift to obtain I and Q signals having absolute phases. Among these signals having the absolute phases, only for the TMCC period, a Viterbi decoding is performed in a Viterbi decoder 909 and an output signal is stored in a FIFO 910 of one super frame capacity. The signal thus stored is subjected to the RS (64, 48) decode in a RS (64, 48) decoder 911 to obtain the TMCC signal.

From this information, it is possible to know a modulation scheme of the modulated wave which is currently received. In accordance with this result, the phase error detection circuit 707 is changed by giving a suitable phase into BPSK, QPSK or 8PSK when BPSK, QPSK or 8PSK is received, respectively. the gate signal generating circuit 806 controls the control signal generating circuit 810 in accordance with the read out value of the TMCC signal and the frame synchronizing signal pulse (see FIG. 9), and a trellis decoder 812 is activated when the HQ signal appears at outputs of the digital roll-off filters 705-1 and 705-2, a Viterbi decoder 813 is activated when a LQ signal appears, and a synchronizer pattern generating circuit 815 or the TMCC is activated for the remaining period. The gate signal generating circuit 817 further generates a gate signal for driving a selection switch 817.

By the above explained signal processing, it is possible to reconstruct a multiplexed data having the frame structure identical with that used in the transmitter end. The so far explained structure is general in the generation and demodulation of the time divisional multiplex modulated wave.

As explained above, when the reception is carried out under a low C/N condition, the data of the HQ portion might have a bit error rate which could not be used. In such a case, the PID information of HQ (packet identifying information) might be changed into the PID information of LQ, and the decoding of the LQ data might be disturbed. Therefore, in the receiving apparatus according to the invention, an error rate of the HQ data is monitored by a bit error rate detection and threshold judgement circuit 820, and when a bit error rate higher than a threshold value is detected, a null packet is inserted into the HQ portion in the multiplexed data having the reconstructed frame structure by a circuit 821. In this manner, the LQ data can be prevented from being influenced by the degraded HQ data.

Figure 10:
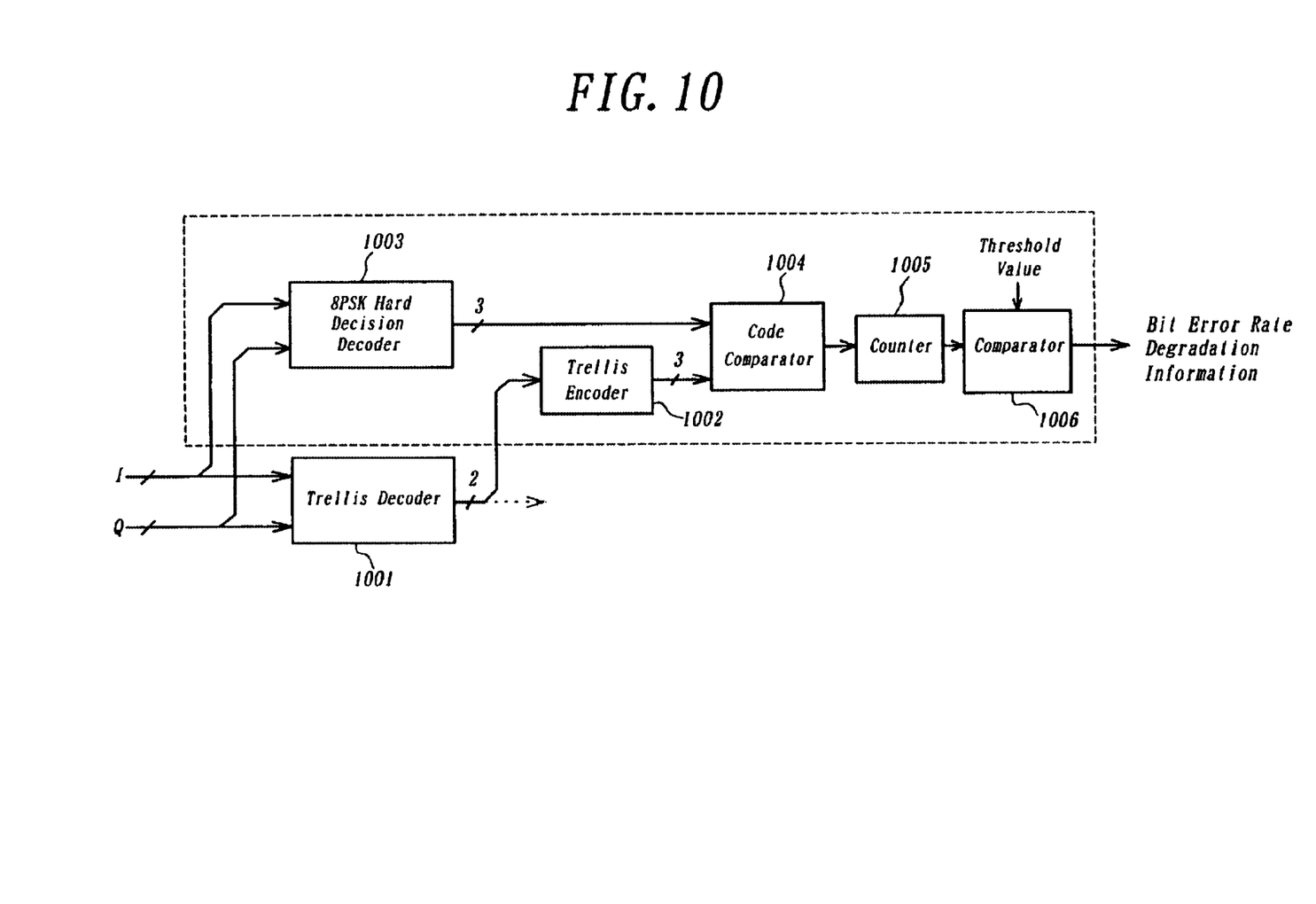
FIG. 10 is a circuit diagram showing an embodiment of the bit error rate detection and threshold judgement circuit.

FIG. 10 shows an embodiment of the bit error rate detection and threshold judgement circuit 820.

In FIG. 10, a complex signal on the synchronously demodulated I, Q plane is input to this circuit. This signal is subjected to the trellis-decoded by a trellis-decoder 1001 to obtain decoded data of two bits per symbol period. This data has substantially no error under the normal C/N condition. Moreover, even if C/N is degraded, a bit error rate of the data is reduced to some extent. When this data is subjected to the same trellis-encoding as that in the transmitter side in a trellis-encoder 1002, it is obtained coded data of three bits having a redundancy for the error correction added thereto.

Figure 11:
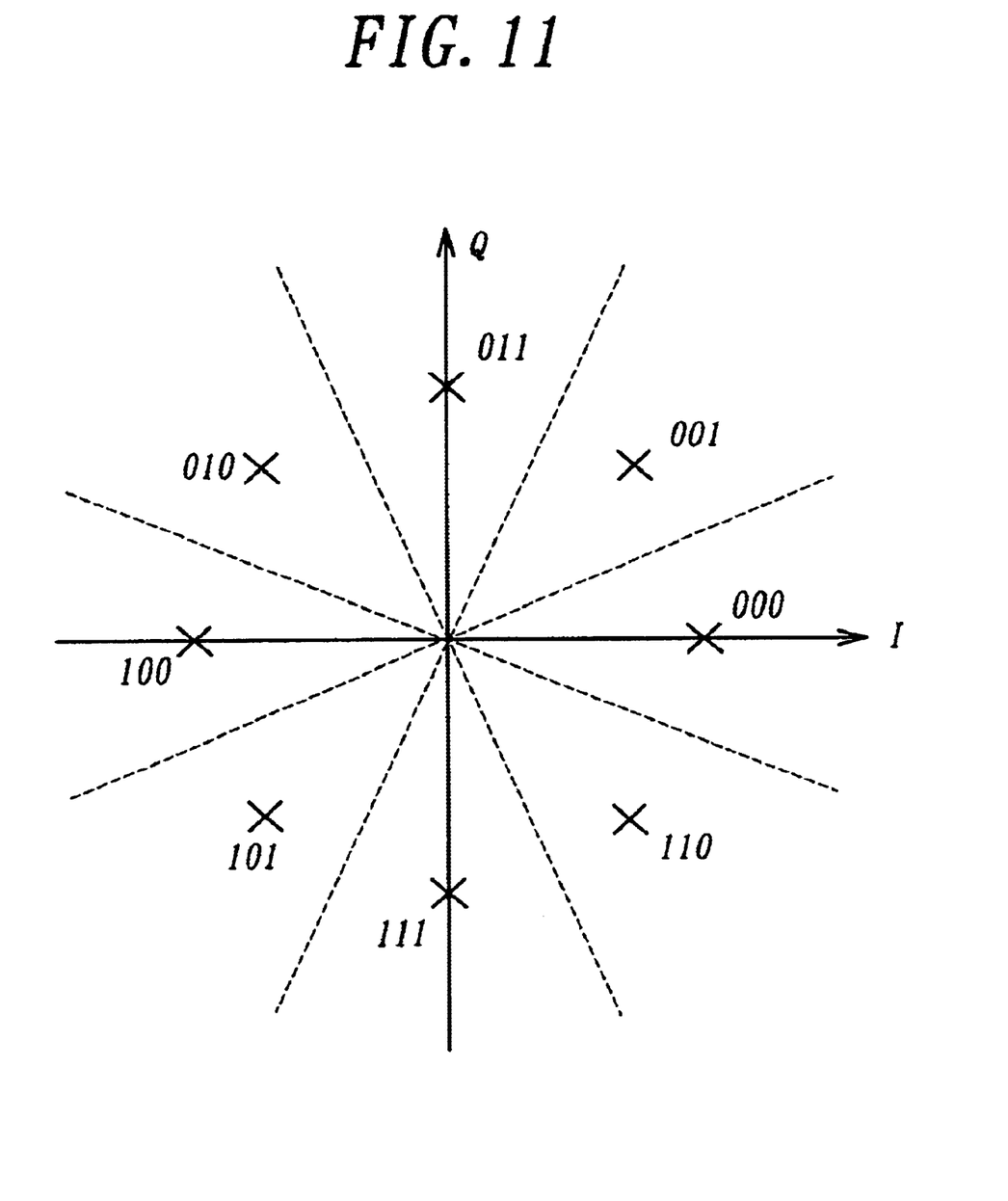
FIG. 11 is a diagram explaining the demodulating operation of the 8PSK hard detection modulator shown in FIG. 10.

On the other hand, when the input signal to this circuit is decoded by an 8PSK decoder 1003, a decoded output of three bits can be obtained as shown in FIG. 11, in which 000–111 are obtained for respective areas divided by dotted lines.

This three bit data is one whose error has not been corrected at all, while the three bit data output from the trellis-encoder 1002 after the trellisdecoded has a suppressed bit error rate. Therefore, when these three bit data signals are compared with each other in a code comparator 1004, it is possible to attain an approximate value of the bit error rate of 8PSK prior to the trellisdecoding. This is counted by a counter 1005 and a count value is compared with a threshold value in a comparator 1006. In this manner, it can be judged whether or not the bit error rate is degraded below the predetermined threshold value.

It should be noted that in FIG. 8, a block denoted by 822 is a circuit for replacing TMCC signal by the original synchronizing code, because on the transmitter side, the synchronizing code (hexadecimal 47) inserted in front bytes of respective TS packets has been replaced by the TMCC. In this manner, the TS packets of original MPEG can be restored.

The output signal from the synchronizing code replacing circuit 822 is supplied to a de-multiplexing circuit 823, which performs an opposite signal treatment to that of the multiplexing device 301 (see FIG. 3) of the time division multiplex modulated wave generating side, and the output signal is divided into plural picture signals, plural audio signals and plural data service signals. Among the thus divided signals, information of a signal in which the null packet is inserted is lost, but this does not affect the services in correctly transmitted packets.

In the time division multiplex modulated wave generating and demodulating systems so far explained, the two hierarchical layer transmission of TC8PSK and QPSK+1/2 is used as an example, but according to the invention, the number of hierarchical layers may be increased. In this case, a plurality of bit error rate detection and threshold judgement circuits similar to that shown in FIG. 10 are provided for all hierarchical layers except for the highest error tolerance transmission scheme, and a null packet is inserted by totally considering outputs from these circuits. Furthermore, the bit error rate detection circuit may be replaced by an error correction unable detecting circuit.

In the above embodiment, when the bit error rate of HQ data exceeds the predetermined threshold value, the relevant HQ data packet is replaced by the null packet. However, according to the invention, a signal in a HQ data packet having an bit error rate exceeding the threshold value may be replaced by any signal which does not affect other HQ or LQ data packets. Such as signal may be a TS error indicator flag. That is to say, a flag of the relevant HQ packet may be 1 and in the de-multiplexing device, this packet may be ignored.

APPLICABILITY ON INDUSTRY

According to the invention, a plurality of transmission schemes formed by combining a plurality of modulation schemes and error correction codes are simultaneously used to perform the multiplex transmission, and under a low C/N condition, data transmitted by a lower C/N transmission scheme can be effectively prevented from being influenced by data transmitted by a higher C/N transmission scheme.

What is claimed is:

1. A digital data receiving apparatus for receiving a plurality of digital data signals transmitted by a time division multiplex mode in accordance with different transmission schemes comprising:

a demodulation circuit for demodulating a time division multiplex signal including a plurality of digital data signals which are transmitted in accordance with different transmission schemes;

a detection circuit for detecting whether or not each of said plurality of digital data signals in the time division multiplexed signal demodulated by said demodulation circuit is received correctly and generating an error signal when a digital data signal transmitted by any one of the different transmission schemes is not received correctly; and a replacement circuit for responding to said error signal to replace said digital data signal which has been detected to be received not correctly by a signal which does not affect a correct reception of digital data signals transmitted by one or more remaining transmission schemes to form a corrected time division multiplexed signal, wherein:

said detection circuit comprises a bit error rate detecting circuit for detecting a bit error rate of each of said plurality of digital data signals in the received time division multiplexed signal, and a comparator for comparing said bit error rate with a predetermined threshold value to generate said error signal when said bit error rate exceeds said threshold value.

2. A digital data receiving apparatus according to claim 1, wherein said bit error rate detecting circuit includes a code comparator for bit-wise comparing a digital data signal which is subjected to the code correction with a digital data signal which is not subjected to the code correction and outputting a result identifying whether the compared codes are not identical with each other, and a counter for counting said output from the code comparator.

3. A digital data receiving apparatus according to claim 1, wherein said replacement circuit includes a circuit for replacing a transmission packet of the digital data signal which has been detected to be received not correctly by a null packet.

4. A digital data receiving apparatus according to claim 1, wherein said demodulation circuit demodulates a time division multiplex signal including a plurality of digital data signals which are transmitted in accordance with BPSK modulation scheme, QPSK modulation scheme and 8PSK modulation scheme.

* * * * *